United States Patent
Dishon

(10) Patent No.: US 12,303,018 B2
(45) Date of Patent: May 20, 2025

(54) REPLACEABLE BRUSH HEAD FOR TOOTHBRUSH

(71) Applicant: Ranir, LLC, Grand Rapids, MI (US)

(72) Inventor: Bryan J. Dishon, Alto, MI (US)

(73) Assignee: Ranir, LLC, Grand Rapids, MI (US)

( * ) Notice: Subject to any disclaimer, the term of this patent is extended or adjusted under 35 U.S.C. 154(b) by 222 days.

(21) Appl. No.: 17/884,991

(22) Filed: Aug. 10, 2022

(65) Prior Publication Data

US 2024/0049872 A1 Feb. 15, 2024

(51) Int. Cl.
*A46B 5/00* (2006.01)
*A46B 5/02* (2006.01)
*A46B 7/00* (2006.01)
*A46B 7/04* (2006.01)
*A46B 9/04* (2006.01)
(Continued)

(52) U.S. Cl.
CPC .............. *A46B 5/0095* (2013.01); *A46B 5/02* (2013.01); *A46B 7/00* (2013.01); *A46B 7/042* (2013.01); *A46B 9/04* (2013.01); *A46B 13/023* (2013.01); *A46B 15/0004* (2013.01); *A46B 15/0012* (2013.01); *A46B 15/0044* (2013.01); *A61C 17/221* (2013.01); *A61C 17/222* (2013.01); *A61C 17/224* (2013.01); *A61C 17/225* (2013.01); *H02J 7/0044* (2013.01); *H02J 7/0048* (2020.01); *H02J 50/10* (2016.02)

(58) Field of Classification Search
CPC ......... A46B 5/0095; A46B 7/04; A46B 7/042; A46B 9/04; A46B 13/023; A46B 15/0004; A46B 15/0012; A46B 15/0044; A61C 17/221; A61C 17/222; A61C 17/224; A61C 17/225
See application file for complete search history.

(56) References Cited

U.S. PATENT DOCUMENTS 4,890,349 A * 1/1990 Nitzsche ................ A46B 7/042
                                                        15/176.5
5,242,235 A    9/1993 Li
(Continued)

FOREIGN PATENT DOCUMENTS

EP       910258 B1   12/2001
EP       959717 B1    3/2003
(Continued)

OTHER PUBLICATIONS

WO 2021/026718 A1; Feb. 18, 2021; Huang.*

*Primary Examiner* — Randall E Chin
(74) *Attorney, Agent, or Firm* — Warner Norcross + Judd LLP

(57) ABSTRACT

A replaceable brush head includes an upper surface, an outer perimeter edge, and a plurality of tufts. The upper surface includes a plurality of bristle tufts. The lower surface includes an outwardly extending knock-out button. The outer perimeter edge includes at least one protrusion. The replaceable brush head may be installed in a toothbrush body that includes a head portion having a recess sized to fit the replaceable brush head with a knock-out opening for the knock-out button and at least one channel for coupling to the at least one protrusion. The replaceable brush head can be removed from the toothbrush assembly by applying a force to the knock-out button in the direction of the tuft plate.

20 Claims, 20 Drawing Sheets

(51) Int. Cl.
*A46B 13/02* (2006.01)
*A46B 15/00* (2006.01)
*A61C 17/22* (2006.01)
*H02J 7/00* (2006.01)
*H02J 50/10* (2016.01)

(56) References Cited

U.S. PATENT DOCUMENTS

| | | |
|---|---|---|
| 5,366,310 A | 11/1994 | Flors |
| 5,555,590 A * | 9/1996 | Blum ................ A46B 7/04 15/176.4 |
| D388,253 S * | 12/1997 | Ra ................... D4/104 |
| 5,864,915 A * | 2/1999 | Ra ................... A46B 7/04 15/176.4 |
| 6,067,684 A | 5/2000 | Kweon |
| 6,141,817 A | 11/2000 | Dawson |
| 6,237,183 B1 | 5/2001 | Fischer |
| 6,487,748 B1 | 12/2002 | Dardar et al. |
| 7,356,866 B2 | 4/2008 | Chan |
| 8,156,599 B2 | 4/2012 | Waguespack et al. |
| 8,336,967 B2 | 12/2012 | Kwon et al. |
| 8,533,889 B2 | 9/2013 | Waguespack et al. |
| 8,695,146 B2 | 4/2014 | Waguespack et al. |
| 8,864,241 B2 | 10/2014 | Waguespack et al. |
| 8,869,340 B2 | 10/2014 | Lee |
| 9,510,667 B2 | 12/2016 | Cho |
| 9,770,090 B2 | 9/2017 | Chen |
| 9,980,554 B2 | 5/2018 | Chen |
| 10,694,838 B2 | 6/2020 | Zoghbi |
| 2011/0162155 A1 | 7/2011 | Wai |
| 2012/0272469 A1 | 11/2012 | Kwon et al. |
| 2017/0217007 A1 | 8/2017 | Chen |
| 2018/0255914 A1 | 9/2018 | Lee |
| 2020/0315758 A1 | 10/2020 | Papazian |

FOREIGN PATENT DOCUMENTS

| | | |
|---|---|---|
| EP | 1933664 B1 | 3/2012 |
| WO | 2012091242 A1 | 7/2012 |
| WO | 2015012461 A1 | 1/2015 |
| WO | 2021012073 A1 | 1/2021 |
| WO | 2021016739 A1 | 2/2021 |
| WO | WO-2021026718 A1 * | 2/2021 |

* cited by examiner

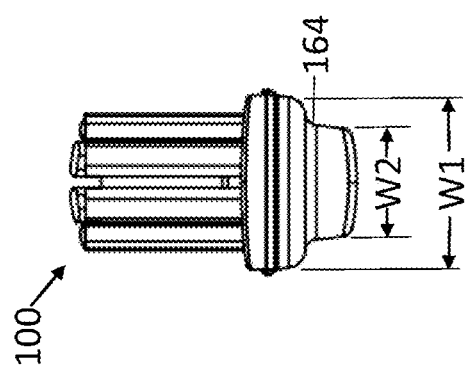
FIG. 9D
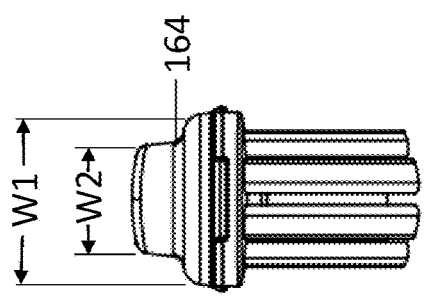
FIG. 9C
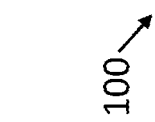
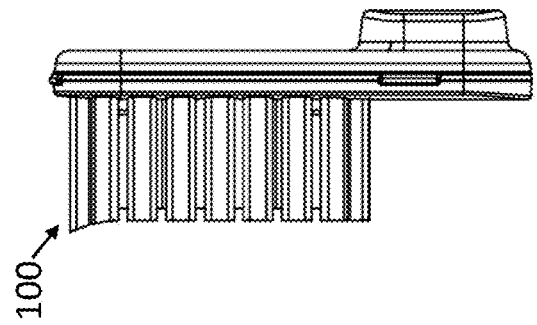
FIG. 9B
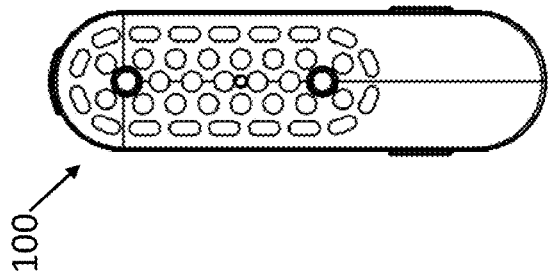
FIG. 9A

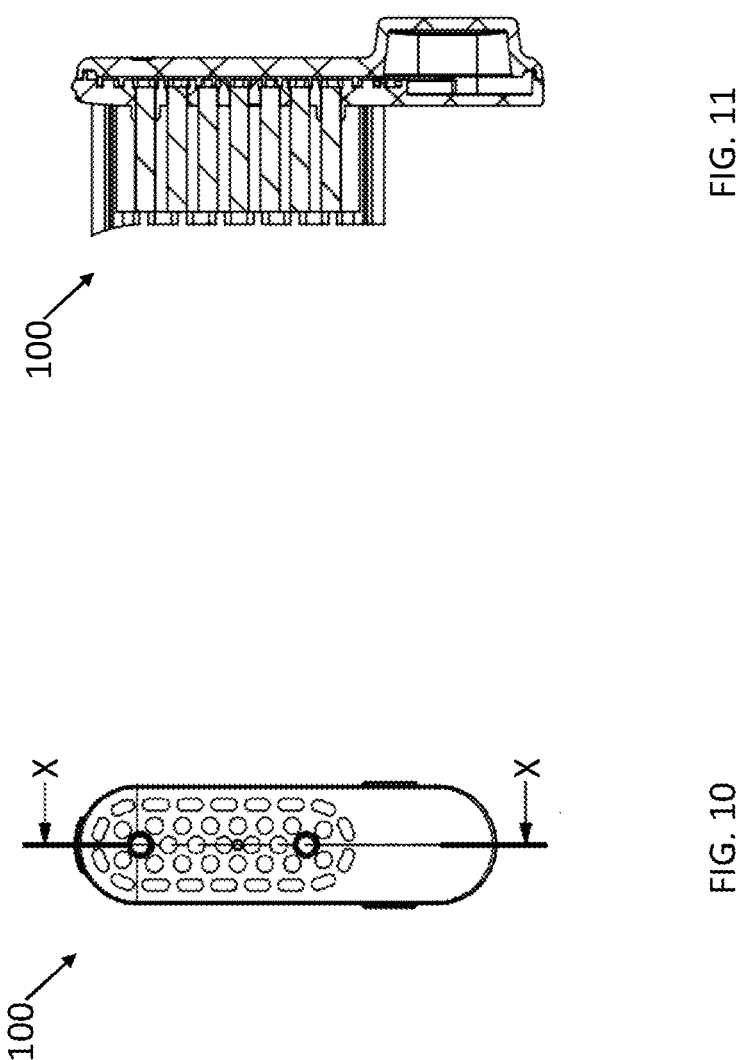

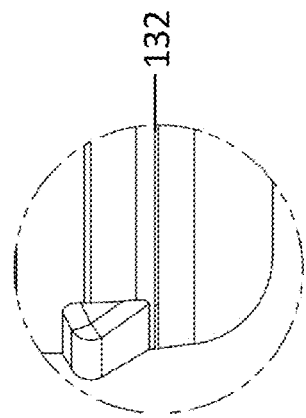
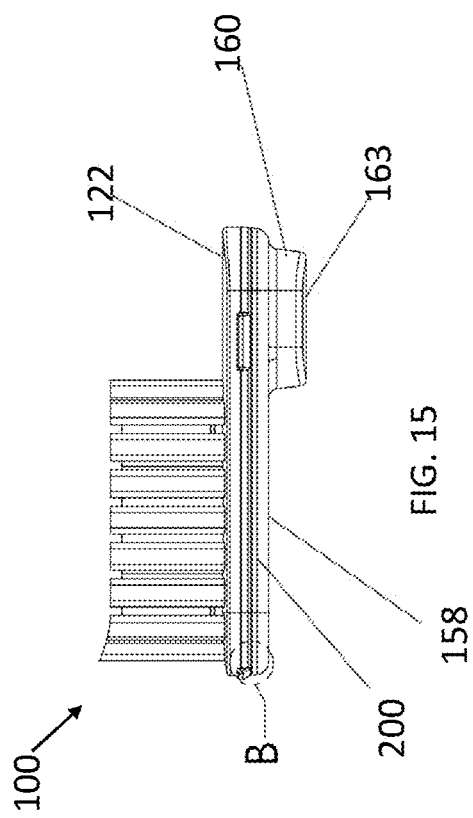

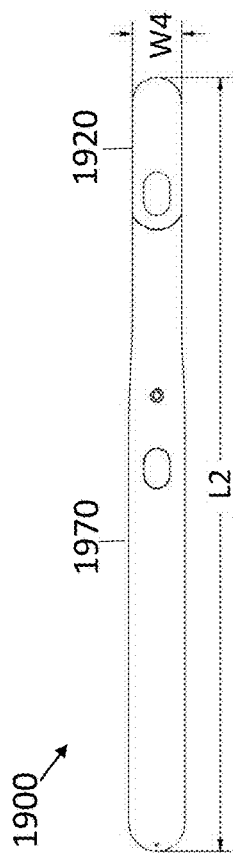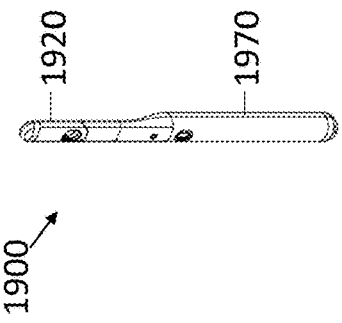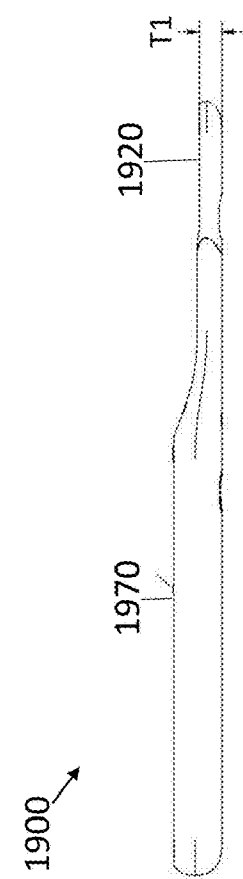
FIG. 20A
FIG. 20B
FIG. 20C
FIG. 20D

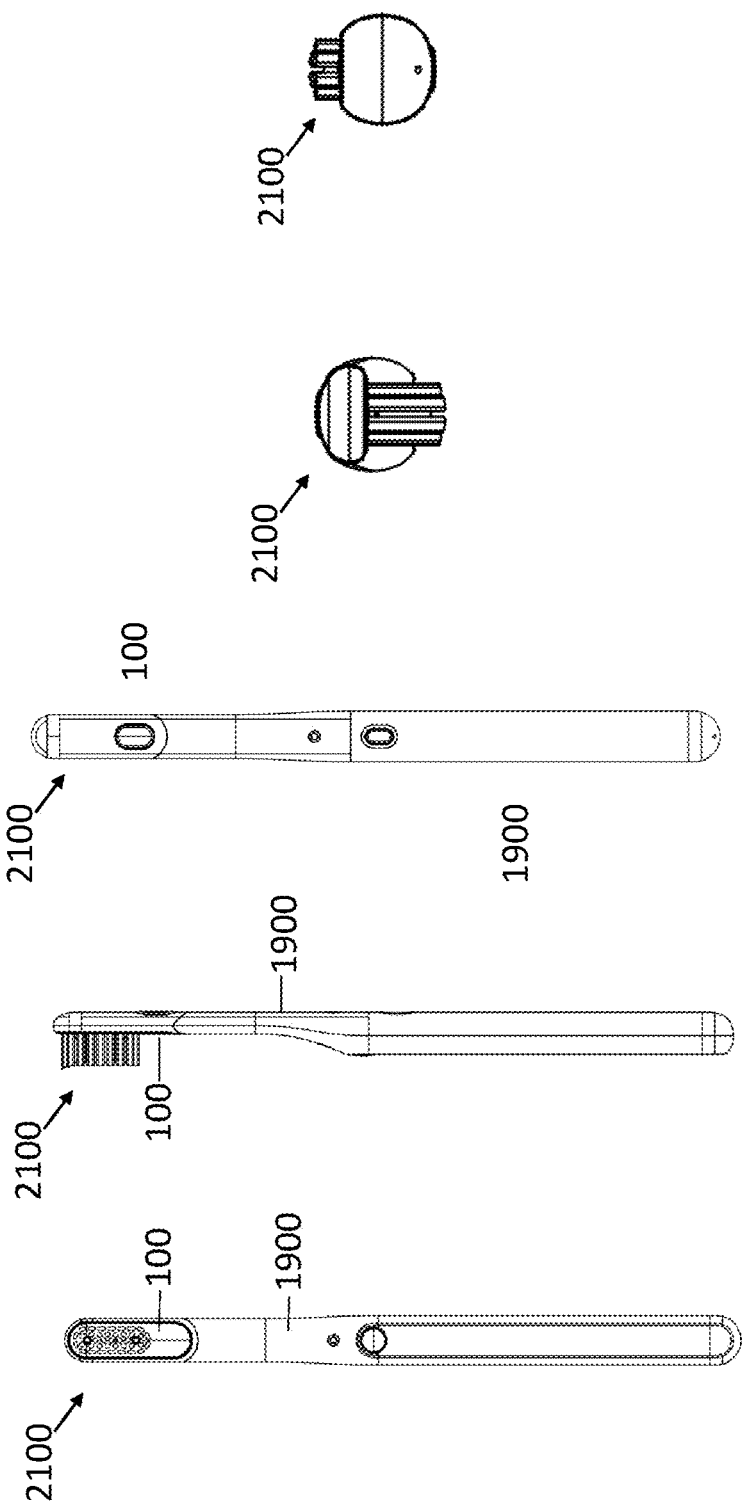

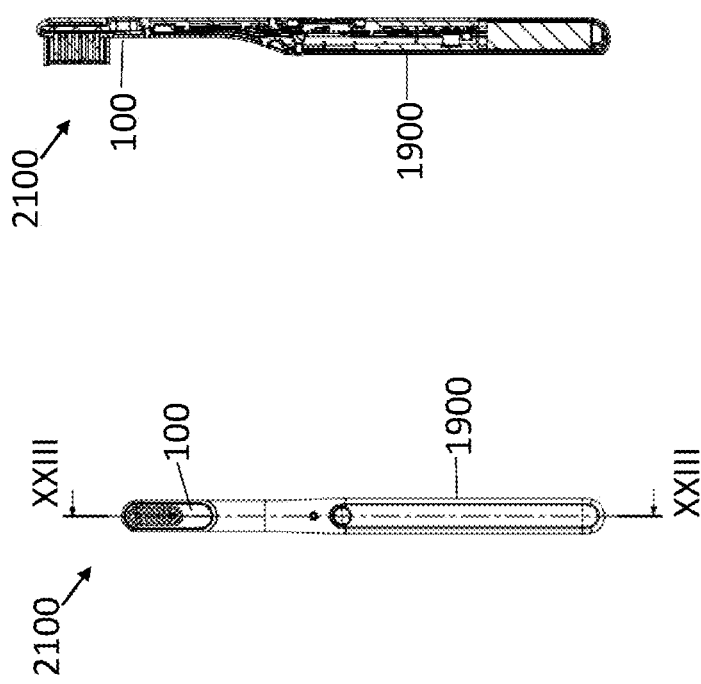

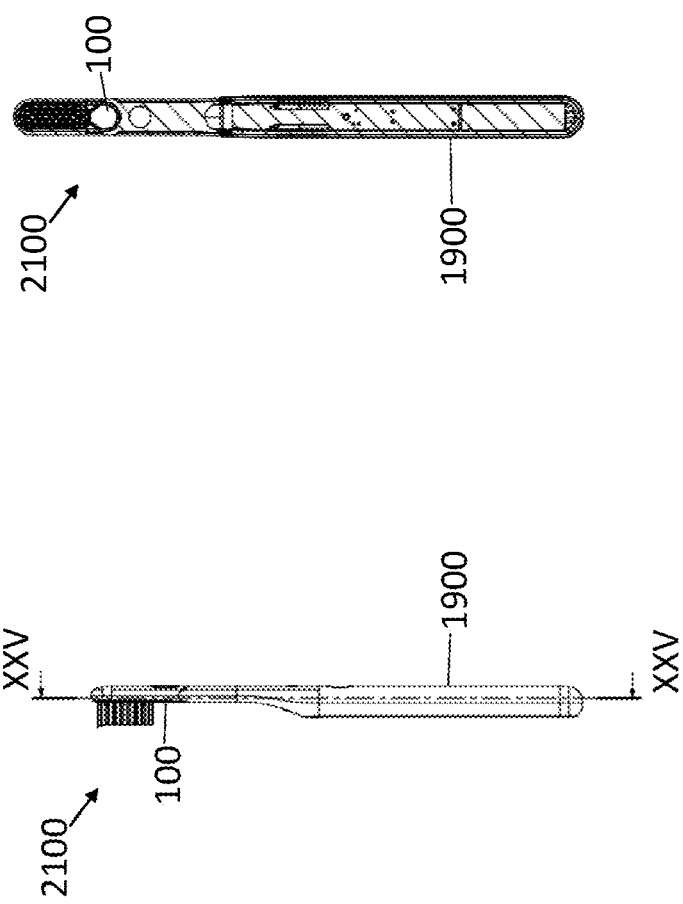

REPLACEABLE BRUSH HEAD FOR TOOTHBRUSH

BACKGROUND OF THE INVENTION

The present invention relates to a toothbrush and a replaceable brush head for a toothbrush.

Replaceable brush heads are interchangeable brush heads that allow a user to exchange the brush head of their toothbrush as needed without having to replace the entire toothbrush. They are generally made from plastic and typically connect to the neck of the toothbrush. In many cases, these replacement brush heads include a bristle carrying head portion and a neck portion extending from the head portion. The neck portion includes an attachment structure, such as a receptacle, for receiving a portion of the toothbrush handle and attaching the brush head to the handle. These replaceable brush heads can be difficult to install and remove, and require replacement of a relatively significant amount of plastic material. With continuous efforts to reduce waste, the amount of plastic material that is discarded after brush head replacement is often undesirable.

SUMMARY OF THE INVENTION

In one aspect, the present invention provides a replaceable brush head for removably attaching to a toothbrush body. The brush head includes a top surface, an outer perimeter edge, and a bottom surface. The top surface defines a plurality of openings, with at least one bristle tuft extending from each of the openings. A plurality of protrusions are spaced from each other and extend from the outer perimeter edge, the protrusions configured to secure the replaceable brush head to the toothbrush body. A knock-out button extends outwardly from a surface of the brush head for direct contact by a user in connection with the uncoupling of the brush head from a toothbrush body.

In another aspect, the replaceable brush head may be part of a toothbrush assembly with a toothbrush body. The toothbrush body may include a housing having a handle portion, a neck portion, and a head portion. The head portion defines a brush head recess sized to fit and receive the brush head, wherein the brush head recess has a sidewall having a shape corresponding to the shape of the outer perimeter edge of the brush head. The brush head recess includes a floor, the head portion defining a knock-out opening extending completely through the floor of the brush head recess, the knock-out opening sized and shaped to receive the knock-out button of the brush head with a portion of the knock-out button being exposed through the knock-out opening for direct contact by a user, the sidewall further defining a plurality of detents, the detents being sized and located to align with the at least one protrusion on the brush head.

The toothbrush body may additionally include a circuit board housed in the handle portion, the circuit board including a power button and a power source. A strain gauge may be housed in the neck portion, and a vibration motor may be housed in the neck portion. A grip portion may at least partially surround the handle portion, the grip portion defining a power button opening aligned with a power button contact.

In yet another aspect, the brush head is formed from a tuft plate and a tuft plate cover that each have a stadium shaped cross section and a curved outer edge. A distal protrusion can extend from the curved outer edge at the distal end of the tuft plate. A pair of proximal protrusions may each extend from the curved outer edge along a portion of the length of the stadium shaped cross section. The plurality of tufts can terminate at at least two different planes above the tuft plate. The bottom surface of the receiving portion may define an opening toward the distal end of the tuft plate cover. The tuft plate and the tuft plate cover may be joined together with an ultrasonic weld. The tuft plate and the receiving portion can have a first width and the knock-out button can have a second width. The first width may be greater than the second width.

The neck portion of the top housing of the toothbrush body may include an indicator light. The head portion may be stadium shaped and the perimeter wall may be curved to receive the replaceable brush head. The perimeter wall can define three channels that are sized and located to align with the distal protrusion and the pair of proximal protrusions on the tuft plate. The bottom housing may define two openings in a bottom surface of the bottom housing. Two ferrous metal pieces may be coupled to the bottom housing through the two openings in the bottom surface. The ferrous metal pieces can be configured to magnetically couple the toothbrush body to a charger. A charging plate can be housed in the handle portion of the component cavity below the circuit board and may direct an electromagnetic field to a charging coil. The grip portion may be overmolded over the bottom housing and the handle portion and the neck portion of the bottom housing. The grip portion can define an indicator light opening aligned with the indicator light.

These and other objects, advantages, and features of the invention will be more fully understood and appreciated by reference to the description of the current aspects and the drawings.

Before the aspects of the invention are explained in detail, it is to be understood that the invention is not limited to the details of operation or to the details of construction and the arrangement of the components set forth in the following description or illustrated in the drawings. The invention may be implemented in various other aspects and may be practiced or may be carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various aspects. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIGS. 9A-9D is a top, side, front, and back view of a replaceable brush head according to one aspect.

FIG. 10 is a top view of a replaceable brush head according to one aspect.

FIG. 11 is a sectional view of the replaceable brush head of FIG. 10 along the line X-X.

FIG. 15 is a side view of a replaceable brush head according to one aspect.

FIG. 16 is a detailed view of detail B of the replaceable brush head of FIG. 15.

FIGS. 20A-20D are a side, top, front, and perspective view of a toothbrush body according to one aspect.

FIGS. 22A-22E are a top, side, bottom, front, and back view of a toothbrush assembly according to one aspect.

FIG. 23 is a top view of a toothbrush assembly according to one aspect.

FIG. 24 is a sectional view of the toothbrush assembly of FIG. 23 along the line XXIII-XXIII.

FIG. 25 is a side view of a toothbrush assembly according to one aspect.

FIG. 26 is a sectional view of the toothbrush assembly of FIG. 25 alone the line XXV-XXV.

DETAILED DESCRIPTION OF THE CURRENT ASPECT

Figure 1A:
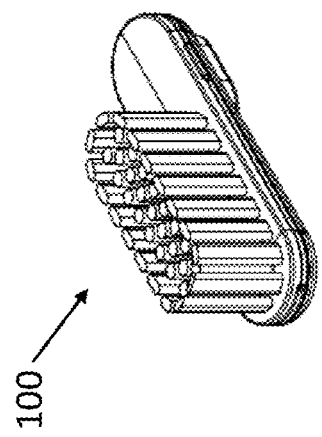
FIGS. 1A-1B are perspective views of a replaceable brush head according to one aspect.
Figure 1B:
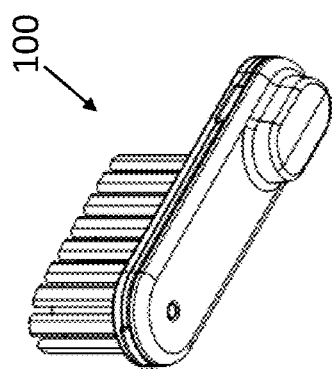
Figure 2:
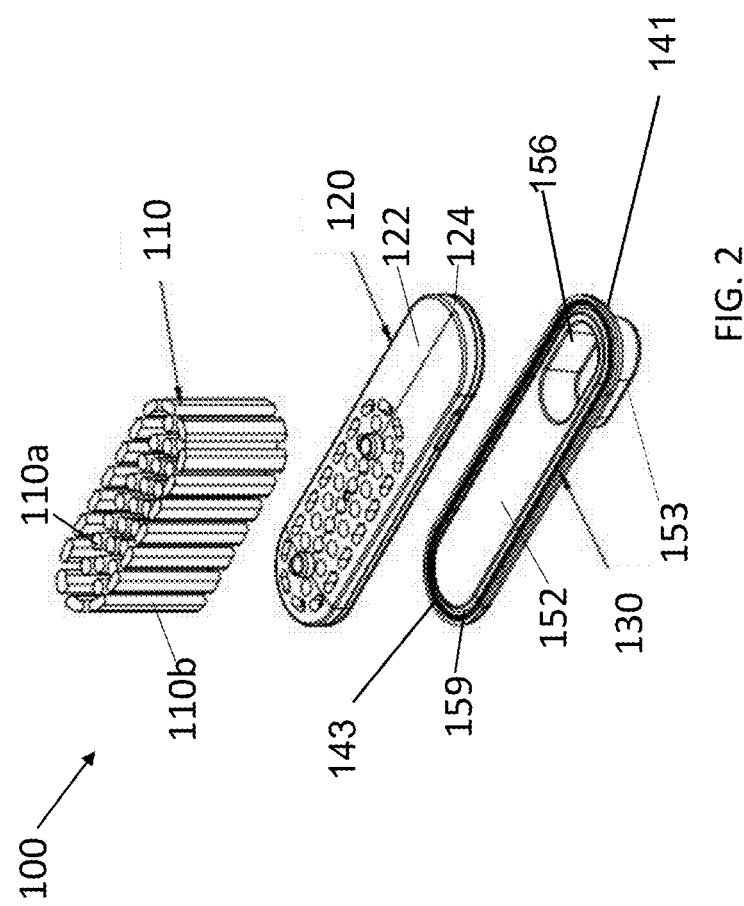
FIG. 2 is an exploded view of a replaceable brush head according to one aspect.

A replaceable brush head 100 according to one aspect is shown in FIGS. 1A-1B. The replaceable brush head 100 is adapted to removably couple to a toothbrush body to form a toothbrush assembly. In one aspect, the replaceable brush head 100 is made from plastic. The replaceable brush head 100 shown throughout the disclosure is stadium shaped (i.e., generally linear, parallel sides with opposing U-shaped ends) when viewed from the top. In another aspect, the replaceable brush head 100 may be any other suitable shape such as a rectangle or oval. In one aspect, the replaceable brush head 100 described throughout may result in an eighty percent reduction in plastic waste over known replaceable brush heads. As shown in FIG. 2, the replaceable brush head 100 may be made up of more than one component. In the aspect shown in FIG. 2, the replaceable brush head 100 includes a plurality of tufts 110, a tuft plate 120, and a tuft plate cover 130. The plurality of tufts 110 may each include a bundle of individual bristles, such as nylon bristles, but one or more of the tufts may otherwise comprise a monolithic cleaning element such as an elastomeric cleaning element. The tuft plate 120 may include a top surface 122, an outer edge 124, and a bottom surface 128. In one aspect, the outer edge 124 is curved. The curved outer edge 124 may have a straight portion to assist in securing the tuft plate 120 to the tuft plate cover 130.

Figure 3:
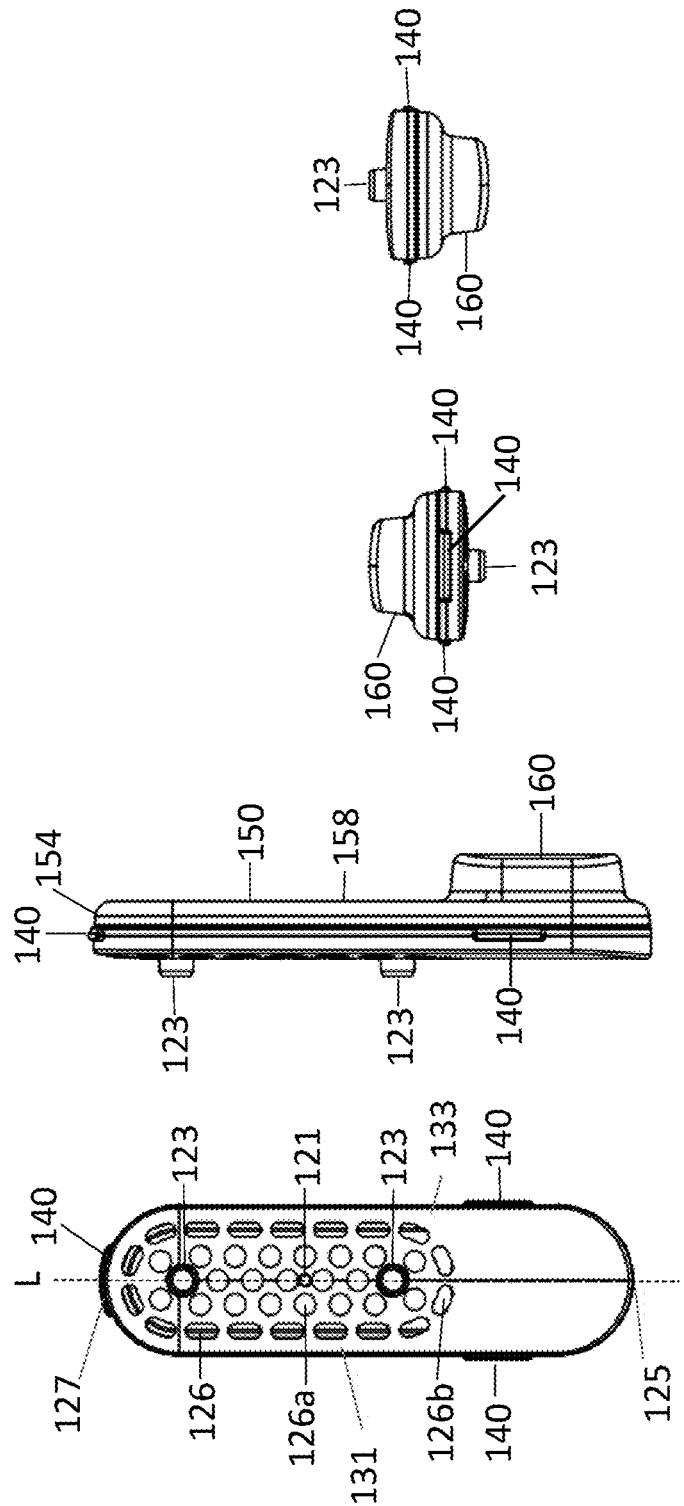
FIGS. 3A-3D are a top, side, front, and back view of a replaceable brush head without tufts according to one aspect.

FIGS. 3A-3D show the tuft plate 120 and the tuft plate cover 130 in more detail. When viewed from the top, the tuft plate 120 may be stadium shaped. Put another way, the tuft plate 120 may have a stadium shaped cross section. The tuft plate 120 may define a plurality of openings 126. As shown in FIG. 3A, the plurality of openings 126 can be at least two shapes 126a, 126b, to accommodate bristle tufts of different shapes. In an alternate aspect, the plurality of openings 126 may be all one shape or three or more shapes. In one aspect, the plurality of openings 126 can be the same shape but different sizes, to accommodate bristle tufts of different sizes. The plurality of openings 126 may be located toward a distal end 127 of the top surface 122. As shown in FIG. 3A, the plurality of openings 126 may cover approximately sixty percent of the length of the tuft plate 120, wherein the length of the tuft plate 120 is defined as the length between a proximal end 125 of the tuft plate and the distal end 127. In one aspect, the plurality of openings 126 can cover any other percentage of the top surface 122. In an alternate aspect, the openings 126 may span all or substantially all of the top surface 122. In another aspect, the openings 126 can be located toward the proximal end 125 of the top surface 122. As depicted, at least some of the openings 126 are arranged in a stadium shape. In another aspect, the openings 126 may be arranged in any other suitable manner. FIGS. 7A-7D are perspective views of the tuft plate 120 and the tuft plate cover 130.

Returning to FIG. 2, the plurality of tufts 110 may be coupled to the tuft plate 120 using the plurality of openings 126. As shown in FIG. 2, the plurality of tufts 110 can have two different shapes 110a, 110b to correspond to the plurality of openings 126 of different shapes 126a, 126b. In an alternate aspect, the plurality of tufts 110 may have different shapes than the plurality of openings 126. As shown in FIG. 2, the number of tufts 110 is equal to the number of openings 126. In an alternate aspect, the number of tufts 110 may not be equal to the number of openings 126. In one aspect, the plurality of tufts 110 can be coupled to the tuft plate 120 using staple technology or anchor-free tufting technology. In another aspect, the plurality of tufts 110 can be coupled to the tuft plate in any suitable manner.

Figure 17:
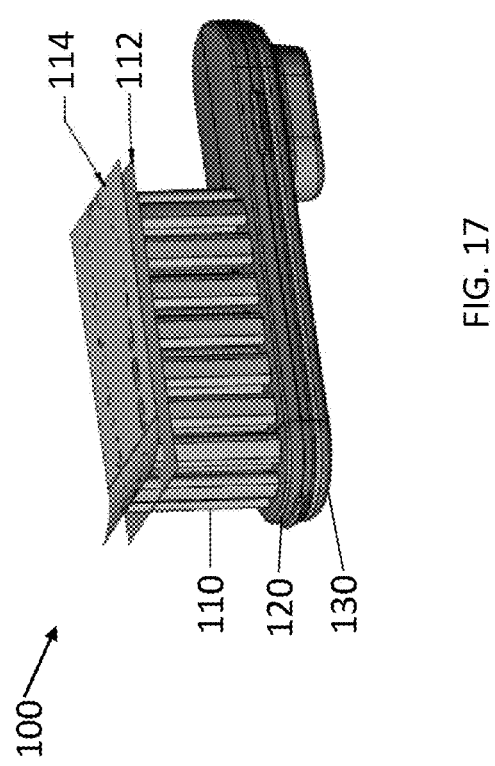
FIG. 17 is a perspective view of a replaceable brush head according to one aspect.
Figure 18B:
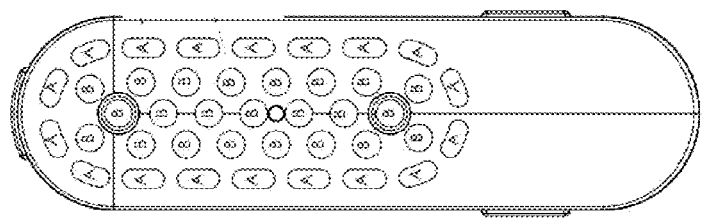
FIGS. 18A-18B are top views of tuft hole locations and tuft profile locations according to one aspect.
Figure 18A:
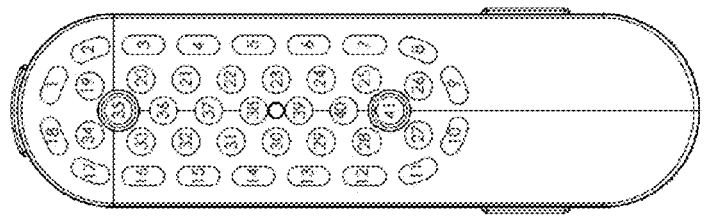

The plurality of tufts 110 can terminate at at least two different planes above the tuft plate 120. FIG. 17 shows the termination planes 112, 114 for the plurality of tufts 110 according to one aspect. As depicted, some of the tufts 110 terminate at the termination plane 112 and some of the tufts 110 terminate at the termination plane 114. Termination plane 114 is further away from the top surface 122 of the tuft plate 120 than termination plane 112. In an alternate aspect, the plurality of tufts 110 may terminate at one plane above the tuft plate 120. FIGS. 18A-18B are top views of tuft hole locations and tuft profile locations for the replaceable brush head 100 according to one aspect. In one aspect, the tuft profiles labelled A in FIG. 18B terminate at termination plane 114 and the tuft profiles labelled B terminate at termination plane 112. In an alternate aspect, the tuft profiles labelled B in FIG. 18B terminate at termination plane 114 and the tuft profiles labelled A terminate at termination plane 112.

Figure 14:
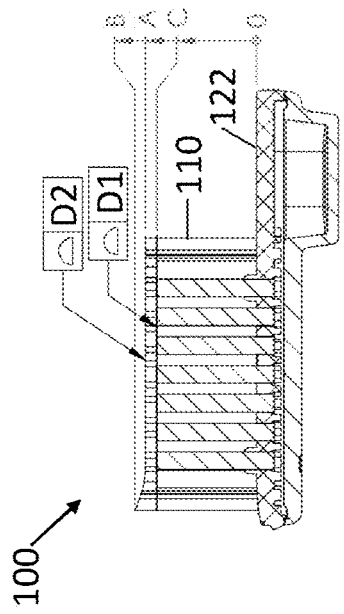
FIG. 14 is a sectional view of the replaceable brush head of FIG. 13 along the line XIII-XIII.
Figure 13:
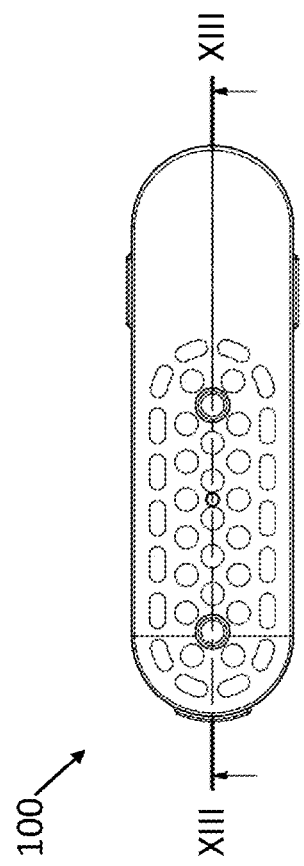
FIG. 13 is a top view of a replaceable brush head according to one aspect.

FIG. 13 is a top view of the replaceable brush head 100 according to one aspect and FIG. 14 is a sectional view of the replaceable brush head of FIG. 13 along the line XIII-XIII. In FIG. 14, the distance D1, D2 between the two shapes of tufts 110 is shown. In one aspect, the distance D1 between tufts 110a of the first shape is 0.4 mm and the distance D2 between tufts 110b of the second shape is 0.4 mm. In the aspect of FIG. 14, the tufts 110 terminate at three planes A, B, and C above the top surface 122 of the tuft plate 120. In one aspect, plane A is 10 mm with a tolerance of plus or minus 0.4 mm, plane B is 1 mm above plane A with a tolerance of plus or minus 0.2 mm, and plane B C is 1 mm below plane A with a tolerance of plus or minus 0.2 mm.

Returning to FIGS. 3A-3D, at least one protrusion 140 may extend from the outer edge 124. The at least one protrusion 140 may be utilized to secure the replaceable brush head 100 to a toothbrush body 1900 as described below with reference to FIGS. 21A-21D. As shown in FIGS. 3A-3D, the tuft plate 120 may have three protrusions 140 extending from the outer edge 124: one protrusion 140 extending from the distal end 127 and two protrusions 140 extending along the length on opposing lateral sides 131, 133 of the tuft plate 120 adjacent the proximal end 125. In one aspect, the tuft plate 120 may have a length of 39.9 millimeters (mm) including the distal protrusion 140 and a width of 11.9 mm including the proximal protrusions 140. Throughout the disclosure, all dimensions have a tolerance of plus or minus 0.05 mm unless otherwise specified. In one aspect, the three protrusions 140 are spaced from each other about the circumference of the outer edge 124, but can be arranged in any other suitable set of locations along the outer edge 124. In an alternate aspect, the tuft plate 120 may have one, two, or any other suitable number of protrusions to secure the replaceable brush head 100 to the toothbrush body 1900. In yet another alternate aspect, one or more of the protrusions 140 may be located on an outer edge 154 of a receiving portion 150 of the tuft plate cover 130.

The tuft plate 120 may include a pair of cylindrical protrusions 123 extending from the top surface 122. The cylindrical protrusions 123 can be substantially aligned along a length axis L as shown in FIG. 3A. In one aspect, the cylindrical protrusions 123 may be any other suitable shape. In one aspect, the tuft plate 120 can have just one cylindrical protrusion 123. In another aspect, the tuft plate 120 may include three or more cylindrical protrusions 123. In one aspect, the cylindrical protrusions 123 can be located in different positions on the top surface 122 of the tuft plate 120. The cylindrical protrusions 123 may be used for locating the tuft plate 120 in the bristling equipment. The cylindrical protrusions 123 can provide alignment to a die that sets the bristle topography.

Figure 4:
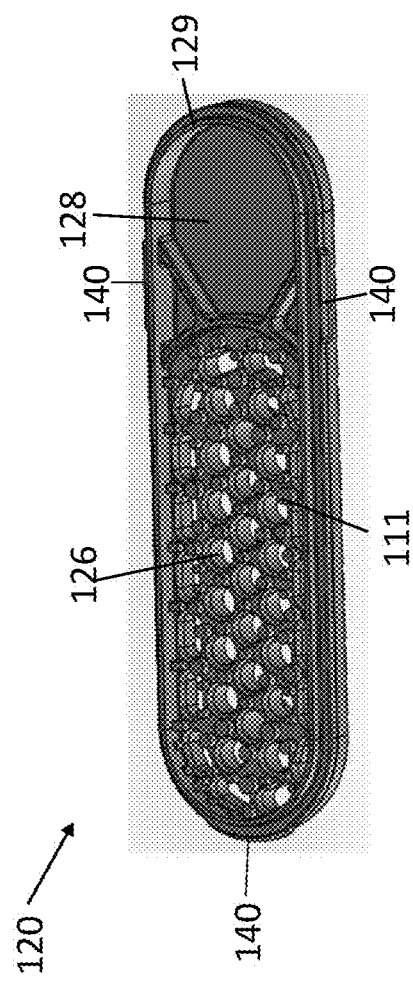
FIG. 4 is a bottom perspective view of a tuft plate according to one aspect.

The tuft plate 120 may define an opening 121 in the top surface 122. As seen in FIG. 4, the opening 121 does not extend through the bottom surface 128 of the tuft plate 120. The opening 121 may be the injection point for the plastic during molding of the tuft plate 120. The opening 121 can be below flush to prevent any gate vestige from protruding into the bristling die.

Turning to FIG. 4, a ridge 129 may extend from the bottom surface 128 of the tuft plate 120 along the outer edge 124 of the tuft plate 120. In another aspect, the ridge 129 may extend only around a portion of the outer edge 124 of the tuft plate 120. A plurality of bonding protrusions 111 can extend from the bottom surface 128 of the tuft plate 120. In a version of the brush head wherein the bristles 110 are attached via anchor-free tufting, the bonding protrusions 111 are melted with the tufts 110 to create a mechanical bond between the two materials.

The tuft plate cover 130 can include the receiving portion 150 and a knock-out button 160. The knock-out button 160 may alternately be referred to as a removal protrusion 160. When viewed from the top, the tuft plate cover 130 may be stadium shaped. Put another way, the tuft plate cover 130 can have a stadium shaped cross section defining the receiving portion outer edge 154. The receiving portion 150 may have a top surface 152 (shown in FIG. 2), the outer edge 154, and a bottom surface 158. In one aspect, the outer edge 154 is curved. As shown in FIG. 2, the receiving portion 150 can define a receiving groove 159 along a perimeter of the top surface 152. The receiving groove 159 is sized to receive a portion of the ridge 129 of the tuft plate 120 when the tuft plate 120 and the tuft plate cover 130 are coupled together, wherein the tuft plate outer edge 124 and the receiving portion outer edge 154 combine to form an outer perimeter edge 200 of the brush head 100. The receiving portion 150 can define a first opening 156 at a proximal end 141. As shown in FIG. 2, the first opening 156 is stadium shaped. In an alternate aspect, the first opening 156 may be any other suitable shape. In another aspect, the receiving portion 150 may not include the first opening 156.

In one aspect, the tuft plate 120 and the tuft plate cover 130 may be joined together through an ultrasonic weld to form the completed brush head 100. FIG. 15 shows a side view of the replaceable brush head 100 according to one aspect. FIG. 16 shows detail B of FIG. 15. An ultrasonic weld seam 132 is shown in FIG. 16. In one aspect, the ultrasonic weld seam 132 may be 0.05 mm with a maximum weld mismatch of plus or minus 0.05 mm. In one aspect, the ultrasonic weld strength can be greater than or equal to fifty Newtons. In an alternate aspect, the tuft plate 120 and the tuft plate cover 130 may be joined together through any other suitable method. For example, the tuft plate 120 and the tuft plate cover 130 can be joined through a fiction fit or through the use of an adhesive. In one aspect, the distance or height of the joined outer perimeter edge 200 of the brush head 100 between the top surface 122 of the tuft plate 120 and the bottom surface 158 of the receiving portion 150 is 4.08 mm and the distance from the top surface 122 of the tuft plate 120 to a terminating edge 163 of the knock-out button 160 is 7.4 mm.

Figure 5:
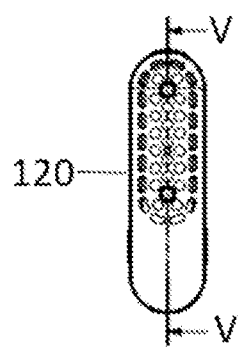
FIG. 5 is a top view of a replaceable brush head without tufts according to one aspect.
Figure 6:
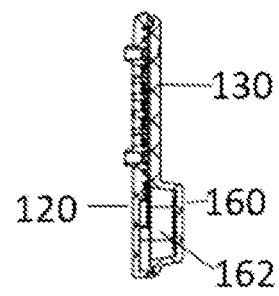
FIG. 6 is a sectional view of the replaceable brush head of FIG. 4 along the line V-V.
Figure 7B:
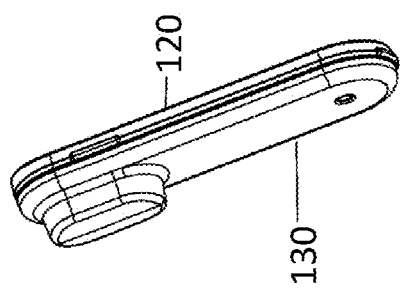
FIGS. 7A-7D are perspective views of a replaceable brush head without tufts according to one aspect.
Figure 7D:
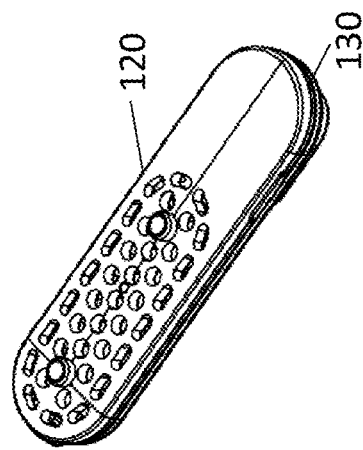
Figure 7A:
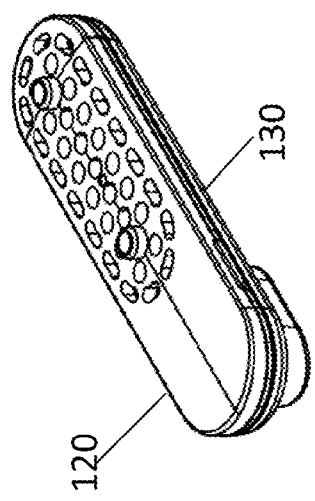
Figure 7C:
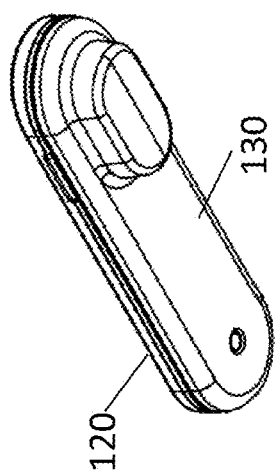

Returning to FIGS. 3A-3D, the knock-out button 160 may extend from the bottom surface 158 of the receiving portion 150. As shown in FIGS. 3A-3D, the knock-out button 160 can extend from the receiving portion 150 at a proximal end 141 of the receiving portion 150. In an alternate aspect, the knock-out button 160 may extend from a different section of the bottom surface 158, or from another surface of the brush head 100. For example, the knock-out button 160 may extend from the bottom surface 158 at the distal end 143 of the receiving portion 150. As depicted, the knock-out button 160 extends from the bottom surface 158 at the location of the first opening 156, wherein the first opening 156 forms a mouth of the knock-out button 160. As depicted, the knock-out button 160 is stadium shaped when viewed from the bottom. In an alternate aspect, the knock-out button 160 may be any other suitable shape. In one aspect, the knock-out button 160 has the same shape as the receiving portion 150. In an alternate aspect, the knock-out button 160 can have a different shape from the receiving portion 150. FIG. 6 shows a cross-section of the tuft plate 120 and the tuft plate cover 130 of FIG. 5 along the line V-V. As shown in FIG. 6, the knock-out button 160 defines a cavity 162 that aligns with and extends from the first opening 156. The cavity 162 helps reduce the amount of plastic required to manufacture the replaceable brush head. In another alternate aspect, the knock-out button 160 extends from the tuft plate 120 and forms a removal protrusion 160 that may be used to remove the brush head 100 by pulling on the removal protrusion or with the aid of a removal tool.

FIGS. 9A-9D show a top, side, front, and back view of the replaceable brush head 100 according to one aspect. As shown in FIGS. 9C-9D, the tuft plate 120 and the receiving portion 150 have a first width W1 and the knock-out button 160 has a second width W2. The first width W1 is wider than the second width W2. In an alternate aspect, the first width W1 may be the same as the second width W2. In another aspect, the first width W1 may be smaller than the second width W2. As depicted in FIGS. 9C-9D, the knock-out button 160 tapers to the width W2 through a tapering portion 164. In an alternate aspect, the knock-out button 160 can have the width W2 throughout without a tapering portion 164. FIG. 10 is a top view of the replaceable brush head 100 according to one aspect and FIG. 11 is a sectional view of the replaceable brush head 100 of FIG. 10 along the line X-X.

Figure 8:
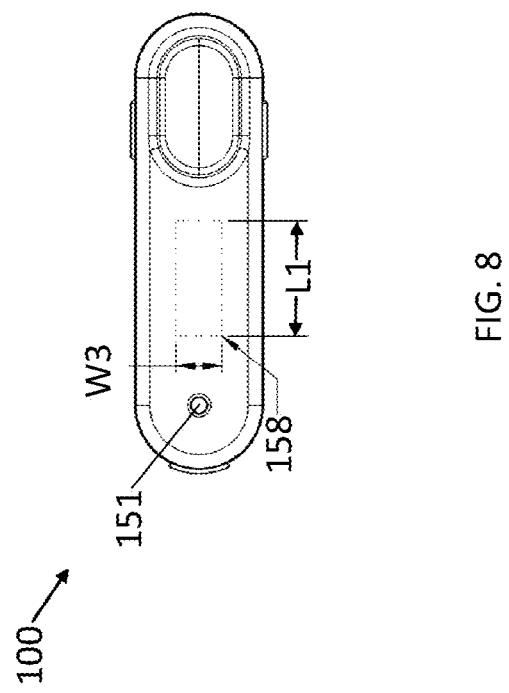
FIG. 8 is a bottom view of a replaceable brush head according to one aspect.
Figure 12B:
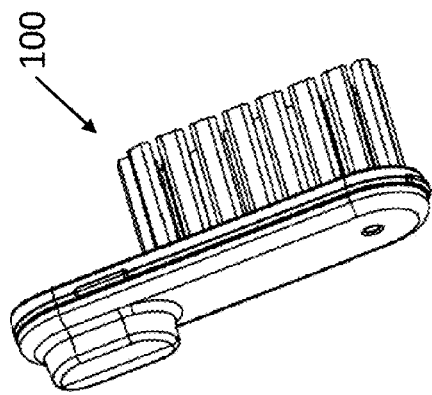
FIGS. 12A-12D are perspective views of a replaceable brush head according to one aspect.
Figure 12D:
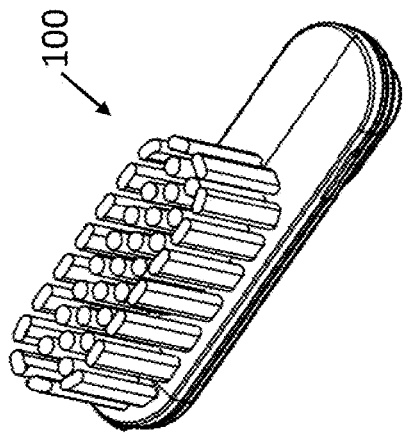
Figure 12A:
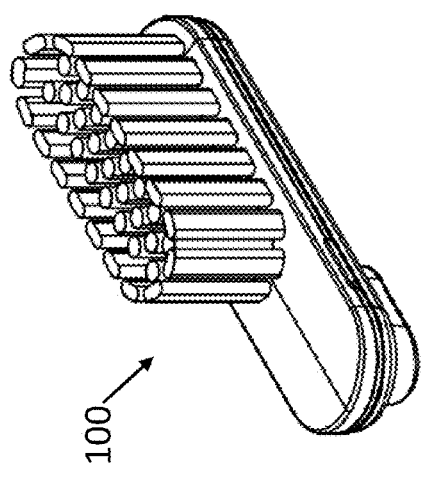
Figure 12C:
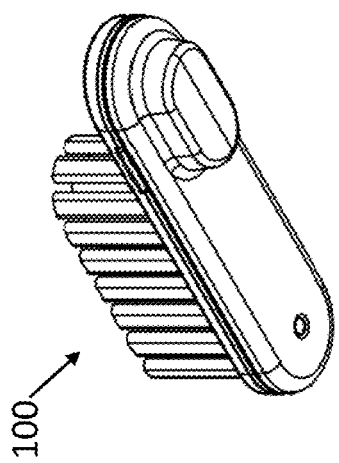

FIG. 8 shows a bottom view of the replaceable brush head 100 according to one aspect. The bottom surface 158 of the receiving portion 150 may define an injection mold gate 151. The gate 151 can serve as a plastic injection point for manufacturing the replaceable brush head 100. The gate 151 may be below flush to prevent any gate vestige from protruding beyond the main surface (bottom surface 158.)

Figure 19:
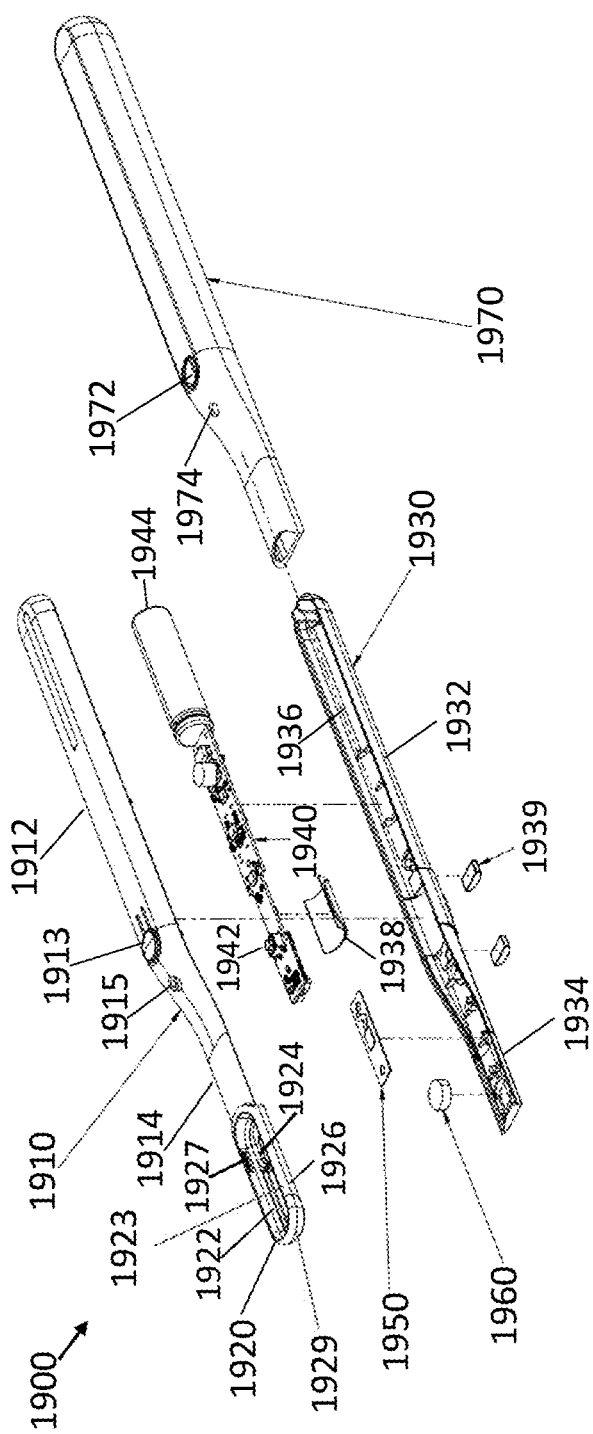
FIG. 19 is an exploded view of a toothbrush body according to one aspect.

The replaceable brush head 100 may be part of a toothbrush assembly 2100. More particularly, the replaceable brush head 100 may be shaped to interfit with and be removable from a toothbrush assembly 2100. FIGS. 21A-21D depict the toothbrush assembly 2100 according to one aspect. The toothbrush assembly 2100 generally includes a toothbrush body 1900. FIG. 19 shows an exploded view of the toothbrush body 1900 according to one aspect. The toothbrush body 1900 can include a top housing 1910, a bottom housing 1930, a circuit board 1940, a strain gauge 1950, a vibration motor 1960, and a grip portion 1970. The top housing may include a handle portion 1912, a neck portion 1914, and a head portion 1920. As depicted, the handle portion 1912 is thicker than the neck portion 1914. The handle portion may include a power button contact 1913. The neck portion 1914 may optionally include an indicator light 1915. In one aspect, the indicator light 1915 can be used to indicate to a user a charging status of the toothbrush assembly 2100.

The head portion 1920 defines a brush head recess 1922 that forms a receptacle 1922 that is sized to fit and receive the outer perimeter edge 200 of the brush head 100. In the embodiment illustrated, the receptacle 1922 is sized to fit and receive the outer edge 124 of the tuft plate 120. The head portion 1920 can also define a knock-out opening 1924 defined in the floor 1923 of the brush head recess 1922. The knock-out opening 1924 may alternately be referred to as a cutout 1924. The knock-out opening 1924 extends completely through the floor 1923 and may be sized and shaped to match the outer surface 163 of the knock-out button 160 and to closely fit and receive the knock-out button 160. As depicted, the knock-out opening 1924 is located at the proximal end of the head portion 1920. In an alternate aspect, the knock-out opening 1924 may be located at the distal end of the head portion 1920. In another aspect, the knock-out opening 1924 can be located anywhere in the head portion 1920 to align with the knock-out button 160. The recess 1922 includes a perimeter wall 1926 with an upper rim 1929. In one aspect, the perimeter wall 1926 may be the same height as the outer perimeter edge 200 of the brush head 100 (i.e., the height of the tuft plate 120 and the receiving portion 1930 coupled together). The internal surface of the perimeter wall 1926 can include at least one channel or detent 1927 that is sized and located to align with the at least one protrusion 140 on the tuft plate 120. In one aspect, the head portion 1920 is stadium shaped. In one aspect, the perimeter wall 1926 is curved to align and correspond in shape with the curve of the outer perimeter edge 200 of the replaceable brush head 100. In one aspect, the head portion 1920 can be made from a hard plastic to create a proper seal between the head portion 1920 and the removable brush head 100. In an alternate aspect, just the perimeter wall 1926 of the head portion 1920 may be made from a hard plastic. In yet another embodiment, at least one of the head 100 and the head portion 1920 can be formed from a resilient material, such as a thermoplastic elastomer.

The bottom housing 1930 can include a handle portion 1932 and a neck portion 1934. The bottom housing 1930 may define a component cavity 1936. The bottom housing 1930 is couplable to the top housing 1910 through any suitable coupling method. The circuit board 1940 can be housed in the handle portion of the component cavity 1936. The circuit board 1940 may include a power button 1942 and a power source 1944. In one aspect, the power source 1944 is a battery. In one aspect, the power source 1944 is a supercapacitor. When the top housing 1910 is coupled to the bottom housing 1930, the power button contact 1913 may be in contact with the power button 1942. The strain gauge 1950 may be housed in the neck portion 1934 of the component cavity 1936 proximal to the handle portion 1932. The strain gauge 1950 may alternately be referred to as a pressure sensor. In one aspect, the strain gauge 1950 can be used to determine whether a user is brushing their teeth too hard. The vibration motor 1960 may be housed in the neck portion 1934 of the component cavity 1936 distal from the handle portion 1932. Locating the vibration motor in the neck portion 1934 can allow the replaceable brush head 100 to vibrate while minimizing the vibration felt in the user's grip.

The bottom housing 1930 may define two openings (not shown) in a bottom surface (not shown) of the bottom housing 1930. A charging plate 1938 may be housed in the handle portion 1932 of the component cavity 1936 below the circuit board 1940. In one aspect, the charging plate 1938 may be made from a ferrous material. Two ferrous metal pieces 1939 can be coupled to the bottom housing 1930 through the two openings in the bottom surface. In one aspect, the two ferrous metal pieces 1939 are permanent magnets. The two ferrous metal pieces 1939 may be configured to couple to a charger to charge the power source 1944. The charging plate 1938 may direct the electromagnetic field received through the ferrous metal pieces 1939 to a charging coil (not shown.)

The grip portion 1970 may at least partially surround the handle portion 1912 and the neck portion 1914 of the top housing 1910 and the bottom housing 1930. In one aspect, the grip portion 1970 is overmolded over the handle portion 1912 and the neck portion 1914 of the top housing 1910 and the bottom housing 1930. In one embodiment, the top and bottom housings 1910, 1930 may be formed of a more rigid plastic, such as polypropylene, and the grip portion 1970 may be formed of a resilient material such as a thermoplastic elastomer. In another embodiment, these portions may be formed of the same polymeric materials. The grip portion 1970 can define a power button opening 1972 that aligns with the power button contact 1913. The grip portion 1970 may optionally define an indicator light opening 1974 aligned with the indicator light 1915 on the top housing 1910. FIGS. 20A-20D show an assembled toothbrush body 1900 according to one aspect. In one aspect, all outer surfaces of the toothbrush body 1900 meet the YICK-SANG YS300001 texture standard. As shown in FIG. 20A, the head portion 1920 has a thickness T1. In one aspect, the thickness T1 may be 6.36 mm. The toothbrush body 1900 can have a length L2 and a width W4 as shown in FIG. 20B. In one aspect, the length L2 may be 219 mm and the width W4 may be 14 mm.

Figure 21A:
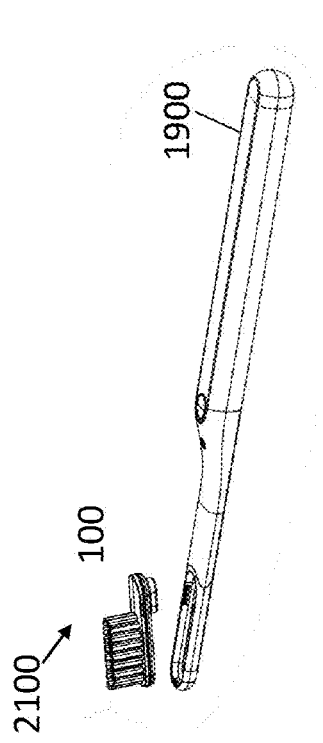
FIGS. 21A-21D are perspective views of a toothbrush assembly according to one aspect.
Figure 21B:
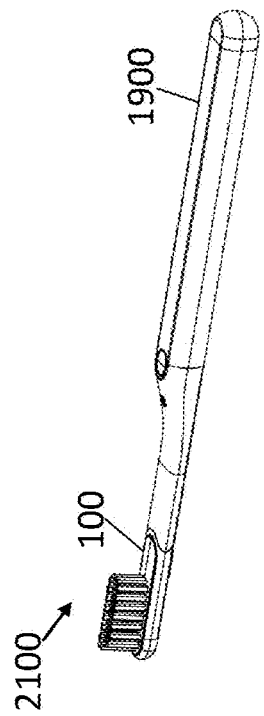
Figure 21C:
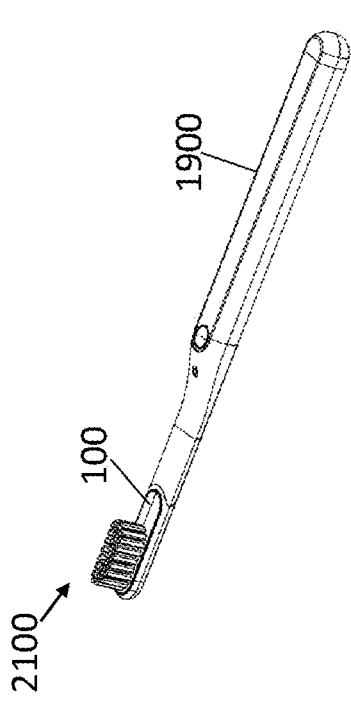
Figure 21D:
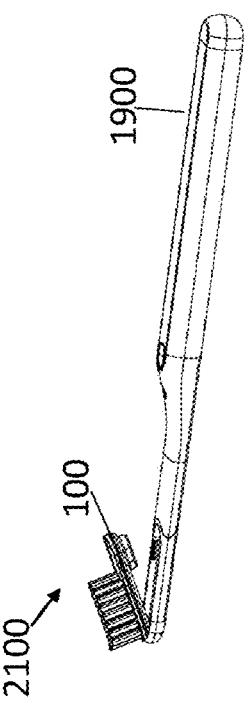

FIGS. 21A-21D are perspective views of the toothbrush assembly 2100 in various stages of coupling and uncoupling of the removable/replaceable brush head 100 with the toothbrush body 1900 according to one aspect. The removable brush head 100 can be coupled to the toothbrush body 1900 by applying a force to the tuft plate 120 until the removable brush head 100 and the toothbrush body 1900 are coupled together. As shown in FIG. 21C, in one aspect, the distal end of the removable brush head 100 may be inserted into the toothbrush body 1900 first such that the distal protrusion 140 aligns with a distal channel 1927 (not shown.) Force may then be applied to the proximal end of the removable brush head 100 such that the knock-out button 160 extends into or through the knock-out opening 1924 and the remaining protrusions 140 align with and interfit with the remaining channels or detents 1927. The coupling between the protrusions 140 and the channels 1927 secures the replaceable brush head 100 to the toothbrush body 1900. Having the protrusions 140 formed wholly on the tuft plate 120 ensures that the replaceable brush head 100 is fully retained in the toothbrush body 1900 even if the tuft plate 120 and the tuft plate cover 130 become uncoupled. In this scenario, the tuft plate cover 130 is trapped between the toothbrush body 1900 and the tuft plate 120, which reduces the risk of loose parts once the replaceable brush head 100 is installed. In one aspect, the top surface 122 of the tuft plate is flush with the terminating edge of the perimeter wall 1926 when the replaceable brush head 100 is installed in the toothbrush body 1900. FIGS. 22A-22E are a top, side, bottom, front, and back view of the toothbrush assembly 2100 according to one aspect. FIG. 23 is a top view of the toothbrush assembly 2100 according to one aspect and FIG. 24 is a sectional view of the toothbrush assembly 2100 of FIG. 23 along the line XXIII-XXIII. FIG. 25 is a side view of a toothbrush assembly 2100 according to one aspect and FIG. 26 is a sectional view of the toothbrush assembly 2100 of FIG. 25 alone the line XXV-XXV.

The design of the replaceable brush head 100 also provides for simple and efficient uncoupling from the toothbrush body 1900. A force may be directly applied by a user to the knock-out button 160 in the direction of the tuft plate 120 by pushing (and in an alternative embodiment, pulling, the knock-out button to dislodge the brush head 100). The force may uncouple the replaceable brush head 100 from the toothbrush body 1900 such that the replaceable brush head 100 can be removed. This allows for convenient and easy replacement of the replaceable brush head 100. In this manner, the knock-out button 160 serves as a "knock-out" button for simple and direct removal by the user with the ability to directly contact the lower surface 163 of the knock-out button 160 to overcome the retention forces created by the interfitted protrusions 140 and detents 1927 and remove the brush head 100. In yet another embodiment, the knock-out button 160 can be replaced or supplemented with additional removal structure, such as a spring disposed between the brush head 100 and the toothbrush body 1900.

The above description is that of current aspects of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all aspects of the invention or to limit the scope of the claims to the specific elements illustrated or described in connection with these aspects. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed aspects include a plurality of features that are described in concert and that might cooperatively provide a collection of benefits. The present invention is not limited to only those aspects that include all of these features or that provide all of the stated benefits, except to the extent otherwise expressly set forth in the issued claims. Features of various aspects may be used in combination with features from other aspects. Directional terms, such as "vertical," "horizontal," "top," "bottom," "front," "rear," "upper," "lower," "inner," "inwardly," "outer," "outwardly," "forward," and "rearward" are used to assist in describing the invention based on the orientation of the aspects shown in the illustrations. The use of directional terms should not be interpreted to limit the invention to any specific orientation(s). Any reference to claim elements in the singular, for example, using the articles "a," "an," "the," or "said," is not to be construed as limiting the element to the singular.

The aspects of the invention in which an exclusive property or privilege is claimed are defined as follows:

1. A replaceable brush head for removably attaching to a toothbrush body, the replaceable brush head including:
   a top surface, an outer perimeter edge, and a bottom surface, the outer perimeter edge having a proximal end and a distal end opposite the proximal end, the brush head defining a length between the proximal end and the distal end,
   the top surface defining a plurality of openings, and having a plurality of bristle tufts, each of the bristle tufts extending from one of the openings, the top surface defining a tufted portion and an untufted portion, the plurality of opening and the plurality of bristle tufts positioned within the tufted portion;
   at least one protrusion extending from the outer perimeter edge, the at least one protrusion configured to secure the replaceable brush head to the toothbrush body; and
   a knock-out button extending outwardly from the bottom surface for contact in connection with an uncoupling of the brush head from a toothbrush body, the knock-out button positioned along the length of the brush head such that it is aligned under the untufted portion and offset from the tufted portion.

2. The replaceable brush head of claim 1, wherein the plurality of tufts terminate at at least two different planes above the top surface.

3. The replaceable brush head of claim 1, wherein the brush head is formed from a tuft plate and a tuft plate cover, the tuft plate including the top surface of the brush head, the tuft plate cover including the bottom surface of the brush head, and at least a portion of the tuft plate and the tuft plate cover combining for forming the outer perimeter edge of the brush head, and wherein the tuft plate and the tuft plate cover are joined together.

4. The replaceable brush head of claim 1, wherein the outer perimeter edge of the brush head includes opposing lateral brush head sides a proximal end and a distal end, and wherein the at least one protrusion includes a plurality of the at least one protrusions spaced from one another, wherein at least one of the at least one protrusions is positioned on the outer edge of the brush head at the distal end and wherein two additional of the at least one protrusions are positioned on the outer edge of the brush head along the opposing lateral sides.

5. The replaceable brush head of claim 4, wherein the two additional protrusions are positioned on the lateral sides and adjacent to the proximal end of the brush head.

6. The replaceable brush head of claim 5, wherein the tuft plate defines a tuft plate outer edge, and wherein the at least one protrusions extend from the tuft plate outer edge.

7. The replaceable brush head of claim 6, wherein the two additional protrusions are vertically aligned with the knock-out button.

8. The replaceable brush head of claim 7, wherein each of the tuft plate and the tuft plate cover has a stadium shaped cross section defining a brush head cross sectional area, and wherein the knock-out button has a stadium shaped cross section defining a knock-out button cross sectional area, wherein the knock-out button cross sectional area is smaller than the brush head cross sectional area.

9. The replaceable brush head of claim 1,
wherein the knock-out button extends outwardly from a portion of the bottom surface, and wherein the knock-out button has an outer edge that is spaced inwardly from the outer perimeter edge of the brush head.

10. The replaceable brush head of claim 1, wherein the plurality of openings are disposed adjacent to the distal end of the brush head and spaced from the proximal end of the brush head and the knock-out button is disposed adjacent to a proximal end of the brush head and spaced from the distal end of the brush head to create the offset of the plurality of the openings and the knock-out button along the length of the brush head.

11. A toothbrush assembly comprising:
a replaceable brush head including a top surface, an outer perimeter edge, a bottom surface opposite the top surface, the top surface defining a plurality of openings with at least one bristle tuft extending from each opening, the bottom surface including a knock-out button extending outwardly from the bottom surface, the outer perimeter edge including a plurality of protrusions spaced from each other about the outer perimeter edge; and
a toothbrush body including:
a housing having a handle portion, a neck portion, and a head portion, the handle portion including a power button contact;
the head portion defining a brush head recess sized to fit the brush head, wherein the brush head recess has a sidewall having a shape corresponding to the shape of the outer perimeter edge of the brush head, the brush head recess having a floor, the head portion defining a knock-out opening extending completely through the floor of the brush head recess, the knock-out opening sized and shaped to receive the knock-out button of the brush head with a portion of the knock-out button being exposed through the knock-out opening for direct contact by a user, the sidewall further defining a plurality of detents, the at least one detent being sized and located to align with at least one of the plurality of protrusions on the brush head;
a circuit board housed in the handle portion, the circuit board including a power button and a power source, the power button being connected to the power button contact;
a strain gauge housed in the neck portion;
a vibration motor housed in one of the handle portion and the neck portion; and
a grip portion, the grip portion at least partially surrounding the handle portion, the grip portion defining a power button opening aligned with the power button contact.

12. The toothbrush assembly of claim 11, wherein both the outer perimeter edge of the brush head and the brush head recess are stadium shaped.

13. The toothbrush assembly of claim 11,
wherein the neck portion of the housing includes an indicator light, and
wherein the grip portion defines an indicator light opening aligned with the indicator light.

14. The toothbrush assembly of claim 11, wherein the replaceable brush head uncouples from the head portion when a force in the direction of the top surface is applied to the knock-out button, and wherein the knock-out opening exposes the knock-out button of the brush head for direct user contact.

15. The toothbrush assembly of claim 11, wherein the grip portion is overmolded over the handle portion and the neck portion housing.

16. The toothbrush assembly of claim 11,
wherein the brush head has a first width and the knock-out button has a second width, and
wherein the first width is greater than the second width.

17. The toothbrush assembly of claim 11, wherein the at least one bristle tuft in each of the plurality of openings includes a plurality of bristle tufts, wherein the plurality of bristle tufts terminate at at least two different planes above the brush head.

18. The toothbrush assembly of claim 11, wherein the plurality of openings form a tufted portion of the brush head spanning about sixty percent of the length of the brush head, and wherein the plurality of openings are positioned adjacent to the distal end to form an untufted portion on the brush head between the tufted portion and the proximal end of the brush head, and wherein the knock-out button is positioned adjacent to the proximal end and within the untufted portion of the brush head.

19. The toothbrush assembly of claim 18, wherein the protrusions include a first protrusion on the outer edge of the brush head at the distal end of the brush head and two protrusions on the outer edge of the brush head adjacent the proximal end.

20. A toothbrush assembly comprising:
a replaceable brush head including:
a tuft plate having a stadium shaped cross section and a curved outer edge, the tuft plate including:
a top surface defining a plurality of openings, the plurality of openings located toward a distal end of the top surface and spaced from a proximal end of the top surface;
a distal protrusion extending from the curved outer edge at a distal end of the tuft plate;

a pair of proximal protrusions each extending from the curved outer edge along a portion of a length of the stadium shaped cross section; and a ridge extending from a bottom surface of the tuft plate along a perimeter of the tuft plate;

a plurality of tufts coupled to the tuft plate through the plurality of openings in the tuft plate; and a tuft plate cover including:

a receiving portion having a stadium shaped cross-section and a curved outer edge, the receiving portion defining a receiving groove along a perimeter of the top surface of the receiving portion, the receiving portion defining a first opening at a proximal end that is stadium shaped, the receiving groove coupling to the ridge of the tuft plate;

a knock-out button extending from a portion of the bottom surface of the receiving portion at a proximal end of the receiving portion the knock-out button defining a cavity, the cavity being aligned with the first opening; and a toothbrush body including:

a top housing including a handle portion, a neck portion, and a head portion, the handle portion including a power button contact, the neck portion including an indicator light, the handle portion having a thickness greater than a thickness of the neck portion;

the head portion having a stadium shape, the head portion including an upper surface defining a brush head recess sized to fit the tuft plate and the receiving portion, the brush head recess having a floor and a sidewall extending upwardly form the floor, the head portion defining a knock-out opening in the floor of the brush head recess, the knock-out opening sized to fit the knock-out button;

the sidewall of the head portion being curved to receive the replaceable brush head, the sidewall defining three detents, the three detents being sized and located to align with the distal protrusion and the pair of proximal protrusions on the tuft plate;

a bottom housing including a handle portion and a neck portion, the bottom housing defining a component cavity, the bottom housing being couplable to the top housing, the bottom housing defining two openings in a bottom surface of the bottom housing;

a circuit board housed in the handle portion of the component cavity, the circuit board including a power button and a power source, the power button being connected to the power button contact when the top housing is coupled to the bottom housing;

a strain gauge housed in the neck portion of the component cavity proximal to the handle portion;

a vibration motor housed in the neck portion of the component cavity distal to the handle portion;

two ferrous metal pieces coupled to the bottom housing through the two openings in the bottom surface, the ferrous metal pieces being configured to magnetically couple the toothbrush body to a charger;

a charging plate housed in the handle portion of the component cavity below the circuit board, the charging plate directing an electromagnetic field to a charging coil; and a grip portion, the grip portion being overmolded over the handle portion and the neck portion of the top housing and the bottom housing, the grip portion defining a power button opening aligned with the power button contact, the grip portion defining an indicator light opening aligned with the indicator light, wherein the tuft plate and the tuft plate cover of the brush head are joined together, wherein the tuft plate and the receiving portion have a first width and the knock-out button has a second width, and wherein the first width is greater than the second width.

* * * * *